United States Patent [19]

Asai et al.

[11] 4,408,479

[45] Oct. 11, 1983

[54] KNOCKING DETECTING DEVICE FOR INTERNAL COMBUSTION ENGINES

[75] Inventors: Kiyokazu Asai; Yujiro Oshima; Akihiro Takeuchi, all of Nagoya; Hiroharu Tokoro, Kariya, all of Japan

[73] Assignee: Kabushiki Kaisha Toyota Chuo Kenkyusho, Aichi, Japan

[21] Appl. No.: 345,537

[22] Filed: Feb. 3, 1982

[30] Foreign Application Priority Data

Feb. 9, 1981 [JP] Japan .................................. 56-17880

[51] Int. Cl.³ ............................................ G01L 23/22
[52] U.S. Cl. ......................................... 73/35; 73/714
[58] Field of Search .................... 73/35, 714; 123/425, 123/435

[56] References Cited

U.S. PATENT DOCUMENTS 2,403,774  7/1946  Whitty et al. ...................... 73/35 X
4,266,421  5/1981  McDougal .............................. 73/35
4,299,117  10/1981  Andrews et al. ....................... 73/35

Primary Examiner—James J. Gill

Attorney, Agent, or Firm—Oblon, Fisher, Spivak, McClelland & Maier

[57] ABSTRACT

A knocking detecting device for an internal combustion engine including: a casing in the form of an annular member fastened substantially perpendicularly to an outer sidewall of the engine block; a support member made of a vibration-isolating material such as rubber or synthetic resin, and having one end fastened to the casing and the other end projecting a predetermined distance from the outer sidewall of the engine block to a position within a water chamber or a coolant water passage; a pressure-sensitive member including pressure-sensitive surfaces mounted on the projecting end of the support member, facing away from each other and extending perpendicularly to the outer sidewall of the engine block, for detecting as a change in an electrical signal pressure vibrations transmitted as a knocking sound to the pressure-sensitive surfaces through coolant water from the partition when knocking is produced in the combustion chamber; and lead wires for delivering the electrical signal change responsive to the knocking. This device enables effective detection of only the knocking produced in the combustion chamber as the pressure vibrations in the coolant water.

11 Claims, 9 Drawing Figures

FIG. 1

PRIOR ART

KNOCKING DETECTING DEVICE FOR INTERNAL COMBUSTION ENGINES

BACKGROUND OF THE INVENTION

1. Field of the Invention

The present invention relates to a knocking detecting device for detecting knocking in an internal combustion engine.

2. Description of the Prior Art

There has recently been studied, developed and partially practiced a control system for operating an engine under the optimum conditions by detecting occurrences of knocking to control ignition timings for spark-ignition internal combustion engines or fuel injection timings for compression-ignition internal combustion engines, in order to improve engine performances as for thermal efficiency, power output, mileage or fuel economy, and the like.

Spark-ignition internal combustion engines generally have a greater tendency to knock with faster ignition timing and a less tendency to knock with retarded ignition timing. Best engine output and specific fuel consumption are available with an ignition timing just before the occurrence of knocking when ignition timing is slowly advanced, or an ignition timing when there is slight knocking (known as trace knocking). Maximum engine performance can thus be obtained by detecting occurrences of such slight knocking for automatic control of optimum ignition timing, that is, by retarding ignition timing by a predetermined angle when slight knocking is detected, or by advancing ignition timing by a given angle when there is no knocking for a certain period of time. To perform such automatic control effectively, a knocking detecting device is required for detecting knocking generated in combustion chambers of an internal combustion engine with a high degree of sensitivity and a high signal-to-noise ratio.

Conventional knocking detecting devices include combustion pressure sensors for detecting vibratory pressures in combustion chambers, vibration sensors for detecting vibrations of engine walls, and a microphone sensor for detecting knocking sounds transmitted through air. It is known that the combustion pressure sensor has a highest signal-to-noise ratio, and the microphone sensor has a lowest signal-to-noise ratio. The combustion pressure sensor, however, needs to be attached to each cylinder for a multicylinder engine, with the result that the overall system is relatively costly. In addition, the combustion pressure sensor requires a complex sensing element for measuring the pressure of a high-temperature gas in the combustion chamber, is less durable, and thus is practically infeasible particularly for automotive engines.

Therefore, the vibration sensor for detecting engine wall vibrations has heretofore been used in practice. This type of knocking detecting device cannot achieve correct control of ignition timing for internal combustion engines since the device has a low signal-to-noise ratio for knocking detection and hence is unable to detect knocking in combustion chambers with precision, for the reasons described below.

Figure 1:
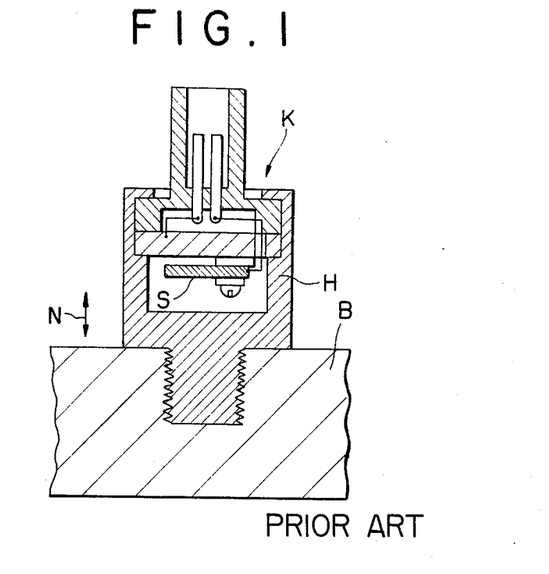
FIG. 1 is a cross-sectional view of a conventional knocking detecting device.

In general, knocking is a phenomenon in which the fuel charge in a combustion chamber burns abnormally to produce pressure waves which cause sudden air-column vibrations in the engine cylinder. The pressure vibration causes combustion chamber walls such as a cylinder wall defining the combustion chamber to produce mechanical vibrations, which in turn are transmitted as a knocking sound to various engine walls. The prior knocking detecting device is designed to detect such engine wall vibrations. More specifically, as shown in FIG. 1, the detecting device K is fastened to an engine wall B such as a cylinder block and comprises a housing or casing H and a vibration detecting element S such as a piezoelectric bimorph element disposed in the housing H for detecting vibrations transmitted to the housing H. The vibration detecting element may comprise a piezoelectric element, a magnetostrictive element, or other elements, which are arranged to detect vibrations on the detector casing with high sensitivity.

Internal combustion engines have numerous sources of vibration, such as cams, valves, bearings and others, which will generate mechanical noise vibrations that are also transmitted to engine walls and detected by the knocking sensor. Thus, the knocking sensor fails to detect knocking with a high signal-to-noise ratio. Frequency analysis of vibratory pressures in a combustion chamber of a gasoline engine upon knocking indicates that there are vibration peak components in a high-frequency range of from about 6 KHz to 10 KHz. To detect vibrations in such a frequency range, the knocking sensor has its vibration detecting element S resonant with respect to knocking vibrations for detecting knocking, or includes a band-pass filter for filtering detected signals to detect a knocking signal. Since vibrations in engine walls of automotive engines include many mechanical noises and vibrations having frequency components which are the same as those of knocking vibrations, it has been inherently difficult with such known detection arrangements to provide a high signal-to-noise ratio for detecting knocking in internal combustion engines. As a result, the prior knocking sensor has been unable to correctly control ignition timing and fuel injection timing, that is, unable to effect correct knocking control, thus failing to gain optimum engine performances as for improved thermal efficiency, power output, fuel consumption.

ANALYSES

With the foregoing in view, the present inventors have studied and analyzed in detail paths along which knocking vibrations or signals, and mechanical vibrations or noises due to causes other than knocking in a water-cooled internal combustion engine are transmitted through the engine block, in an effort to attain an increased signal-to-noise ratio in knocking detection for a higher precision with which knocking can be detected. As a consequence, the following have been found.

(1) Upon knocking, sudden pressure waves or vibratory pressures generated in a combustion chamber are first transmitted to combustion chamber walls such as a cylinder liner defining the combustion chamber, an upper wall of the combustion chamber or the like. The vibrations are transmitted as elastic waves through engine components having complex configurations, such as the cylinder block and the cylinder head, as the elastic waves are subjected to reflection, interference, and resonance, and finally reach an outer wall of the cylinder block to which a knock sensor is to be attached. The pressure waves in the combustion chamber, on the other hand, are transmitted to a surrounding wall of the combustion chamber, such as the cylinder liner, that is, a partition defining a water chamber, then transmitted from the cylinder liner into coolant water in the water chamber defined between the cylinder liner and the outer wall of the cylinder block, and then go through the coolant water.

In gasoline engines, a combustion chamber has a maximum combustion pressure therein of about 60 atmospheric pressures upon knocking, and the magnitude of abnormal pressure vibrations due to knocking in the pressure chamber is about 10% of the maximum combustion pressure. The pressure wave of such a high magnitude is transmitted through the cylinder liner having a thickness of about 5 mm into the coolant water adjacent to the combustion chamber which is the source of knocking sounds. Therefore, the sound pressure of the knocking sound in the coolant water is considerably high. The knocking sound in the coolant water can thus be detected with high sensitivity.

(2) Mechanical vibrations or noises generated by such sources of vibrations as cams, valves and bearings of engines are transmitted, together with knocking vibrations or sounds, through engine components such as a cylinder head and a cylinder block to an outer wall of the cylinder block on which a knock sensor is to be mounted. The noise vibrations at the noise sources have a magnitude which is quite small as compared with that of vibrations created by knocking in the cylinder liner in the vicinity of the source of knocking sounds. The sources of such noises are disposed remotely from the water chamber that surrounds the cylinder liner. Therefore, the magnitude of noise vibrations reaching components adjacent to the water chamber is quite small, with the result that noises substantially fail to be transmitted into the coolant water in the water chamber. Knocking sounds in the coolant water can thus be detected with a high signal-to-noise ratio.

(3) There are quite a large number of sources of noise vibrations in engines, such for example as striking sounds produced by engine cams, striking sounds generated when valves hit their seats, and mechanical vibration sounds emitted due to clearance in bearings. The noise vibrations from these sources are transmitted through an engine block in various vibration forms such as longitudinal waves, transverse waves, and plate waves. While the vibrations go through the engine block having a complex shape, the waves are subjected to reflection and interference, and cause new resonant vibrations in various parts in the engine block, before the vibrations arrive at a portion of the engine block where a knocking sensor is installed. The vibrations reaching such portion of the engine block are composed of vibration components in all directions. The conventional knocking sensor for detecting engine wall vibrations, however, detect a vibration component applied in the direction of the arrow N shown in FIG. 1, that is, a transverse vibration component on the engine wall. Vibration sounds due to knocking have components transmitted through the engine block in the same manner as the noises, and their transverse vibration component N is detected. Thus, the knocking sounds and the noises have heretofore been detected in the same vibration form, and have not separately been detected.

The present inventors, however, have devised a process for detecting knocking sounds and noise vibrations as separate vibration forms. More specifically, knocking is detected by receiving only pressure vibrations transmitted into coolant water in response to radial vibratory displacement of a cylinder liner due to pressure vibrations in a combustion chamber, and by completely blocking reception of vibrations transmitted through the walls of a cylinder wall. This arrangement is based on the principle that only pressure waves are present in a liquid, and no transverse waves or shear waves are present therein which would otherwise be in a solid. Noises are transmitted through engine block walls in vibration forms such as longitudinal waves, transverse waves and plate waves. Knocking detecting devices according to the present invention, however, are designed not to pick up such noises as described later. With the arrangement of the present invention, a pressure-sensitive member for receiving pressure vibrations transmitted through a liquid is completely shielded from an engine block wall with respect to the reception of vibrations.

Where noises are transmitted into coolant water as pressure waves due to transverse vibrations of outer engine block walls, the vibration pressure of the noises thus transmitted through the water is reduced to about 6/100 due to a large difference between specific acoustic impedances of the engine block wall of metal and the water. The pressure-sensitive member may have a selected reception directivity to prevent detection of such slight noise vibrations.

SUMMARY OF THE INVENTION

The present invention has been accomplished by the inventors on the basis of the results of the foregoing study and analyses. It is an object of the present invention to provide a knocking detecting device for detecting, while an engine is in operation, pressure waves transmitted into coolant water surrounding an engine combustion chamber due to abnormal pressure vibrations generated in the combustion chamber upon knocking, to thereby detect an occurrence of knocking to a nicety for automatic control of a spark-ignition internal combustion engine for optimum ignition timing, so that best engine performance can be gained.

Another object of the present invention is to provide a knocking detecting device for a water-cooled internal combustion engine having a combustion chamber and a water chamber surrounding the combustion chamber and receptive of coolant water, the knocking detecting device including a pressure-sensitive member disposed in the coolant water adjacent to a partition such as a cylinder liner for detecting the sound pressure of a knocking sound transmitted through the coolant water from the partition due to abnormal pressure vibrations generated in a combustion chamber upon knocking, so that knocking produced in the combustion chamber can be detected with high sensitivity.

Still another object of the present invention is to provide a knocking detecting device fastened to a sidewall of an engine block and having a pressure-sensitive member disposed in coolant water, the pressure-sensitive member being supported on a casing by a support member made of a vibration-isolating material such as rubber or synthetic resin and projecting far into the water, so that the pressure-sensitive member will be shielded from the influence of pressure vibrations transmitted from the engine block sidewall into the coolant water, and mechanical noise vibrations transmitted through the casing from the engine block sidewall will be absorbed by the support member before reaching the pressure-sensitive member.

Still another object of the present invention is to provide a pressure-sensitive member having pressure-sensitive surfaces extending in a direction perpendicular to the sidewall of the engine block to provide a vibration reception directivity such that the pressure-sensitive member will not detect mechanical noise vibrations having vibratory displacements parallel to the pressure-sensitive surfaces, such as transverse vibrations of the block sidewall, and will thus detect knocking produced in a combustion chamber with a high signal-to-noise ratio by preventing reception of mechanical noise vibrations even if they are transmitted from the engine block through the support member.

Still another object of the present invention is to provide a knocking detecting device for detecting knocking in any cylinder of a multicylinder engine with substantially the same sensitivity, the knocking detecting device including a pressure-sensitive member disposed in engine coolant water and having pressure-sensitive surfaces which face away from each other to receive the sound pressure of a knocking sound transmitted through the water and which extend perpendicularly to a partition such as a cylinder liner, so that the pressure-sensitive member will receive knocking sounds transmitted in either direction through a water chamber from the partition, the pressure-sensitive surfaces will receive sound waves falling normally thereon with high sensitivity and receive perpendicular vector components of sound waves falling at an angle thereon with lower sensitivity, thus providing a selected directivity for receiving sound waves through the water.

According to the present invention, a knocking detecting device for an internal combustion engine including an engine block having combustion and water chambers defined by a partition and a coolant water passage connected to the water chamber, comprises: a casing in the form of an annular member fastened substantially perpendicularly to an outer sidewall of the engine block; a support member made of a vibration-isolating material such as rubber or synthetic resin, and having one end fastened in a liquid tight manner to the casing and the other end projecting a predetermined distance from the outer sidewall of the engine block to a position within the water chamber or the coolant water passage; a pressure-sensitive member including pressure-sensitive surfaces mounted on the projecting end of the support member and facing away from each other, the pressure-sensitive surfaces extending perpendicularly to the outer sidewall of the engine block, for detecting as a change in an electrical signal pressure vibrations transmitted as a knocking sound to said pressure-sensitive surfaces through coolant water from the partition when knocking is produced in the combustion chamber; and lead wires extending through the support member and connected to the pressure-sensitive member for delivering the electrical signal change responsive to the knocking as detected by the pressure-sensitive member exteriorly of the engine block, whereby only the knocking produced in the combustion chamber can effectively be detected as the pressure vibrations in the coolant water.

The knocking detecting device thus constructed in accordance with the present invention is advantageous in that the pressure-sensitive member located in the coolant water in the water chamber surrounding the combustion chamber with the partition therebetween is positioned closely to the source of knocking sounds in the combustion chamber, and can detect, with high sensitivity, knocking sounds or pressure vibrations transmitted into the coolant water through the partition which is of a reduced thickness and has a wide area of contact with the coolant water.

The knocking detecting device of the present invention is also advantageous in that the pressure-sensitive member located in the coolant water in the water chamber surrounding the combustion chamber with the partition therebetween is positioned remotely from sources of mechanical noises such as engine cams, valves, and bearings, and can detect only pressure waves resulting from knocking sounds with a high signal-to-noise ratio since the magnitude of mechanical noise vibrations transmitted through the partition and other components adjacent to the water chamber is quite small as compared with that of pressure vibrations due to knocking sounds and also because the pressure-sensitive member is disposed in the coolant water in which no transverse waves (shear waves) are present unlike in a solid.

The knocking detecting device of the present invention is also advantageous in that, since it can detect pressure vibrations of knocking sounds with high sensitivity and high signal-to-noise ratio, it can also detect slight knocking and limits of knocking generation with precision.

With the knocking detecting device being fixed to the outer sidewall of the engine block through the support member formed of a vibration-isolating material such as rubber or synthetic resin, the knocking detecting device can be shielded by the support member from mechanical noise vibrations in a high frequency range transmitted through the outer sidewall of the engine block. The pressure-sensitive surfaces of the pressure-sensitive member lie perpendicularly to the outer sidewall of the engine block, so that the pressure-sensitive member is immune to transverse vibrations of the engine block which constitute vibratory displacements in a direction parallel to the pressure-sensitive surfaces. Thus, the mechanical noise vibrations in the outer sidewall of the engine block are prevented from being transmitted to the pressure-sensitive surfaces. With the pressure-sensitive member being mounted on the distal end of the support member which project away from the outer sidewall of the engine block, the pressure-sensitive member is not subjected directly to the influence of pressure vibrations transmitted from the surface of the outer sidewall of the engine block into the coolant water. Thus, the knocking detecting device of the present invention is advantageous in that it can detect, with high precision, only pressure vibrations of knocking sounds transmitted into the coolant water through the partition.

The knocking detecting device according to the present invention is also advantageous in that, with the pressure-sensitive surfaces of the pressure-sensitive member in the water chamber facing away from each other and extending perpendicularly to the outer sidewall of the engine block which extends along the partition defining the combustion chamber, the pressure-sensitive member can detect pressure vibrations of knocking sounds transmitted in either direction through the water chamber from the partition.

The knocking detecting device of the present invention is further advantageous in that it can detect pressure vibrations due to knocking produced in the combustion chamber with high sensitivity and high signal-to-noise ratio and hence can detect slight knocking and limits of knocking generation, whereby ignition timing and fuel injection timing can be controlled to a nicety for optimum engine performances as for improved thermal efficiency, power output, fuel economy or mileage, and the like.

The knocking detecting device of the present invention may be in the form of the following aspects.

According to a first aspect, the pressure-sensitive surfaces of the pressure-sensitive member comprise piezoelectric elements for detecting pressure variations acting on the pressure-sensitive surfaces as a change in an electrical signal.

The knocking detecting device of the first aspect is advantageous in that the pressure-sensitive surfaces convert the pressure vibrations acting thereon due to knocking sounds directly into the electrical signal change, and hence the knocking detecting device is simple in construction, can be manufactured with ease, is inexpensive to produce, durable in operation, and can easily be maintained.

According to a second aspect, the pressure-sensitive surfaces of the pressure-sensitive member comprise vibratory plates having a predetermined thickness and a predetermined area, and a resonance frequency in the range of frequencies of knocking produced, and electromechanical transducers, the vibratory plates being mechanically displaceable in response to pressure vibrations in water acting as a knocking sound on the pressure-sensitive surfaces, for thereby enabling the electromechanical transducers to detect the mechanical displacement of the vibratory plates as a change in an electrical signal.

The knocking detecting device according to the second aspect is advantageous in that the thickness, area, and material of the vibratory plates can be changed as desired in order to have a resonance frequency within a range of frequencies of knocking, and the electromechanical transducer and the mechanical displacement to be detected can be selected as desired, so that only the pressure vibrations due to knocking sounds can be detected with high sensitivity, and a control circuit for the transducer can be simplified by dispensing with a complicated circuit for removing noise signals.

According to a third aspect, a knocking detecting device for an in-line internal combustion engine having a plurality of cimbustion chambers arranged in line in the cylinder block, includes a casing fastened to the outer sidewall of the engine block at a central portion thereof in the longitudinal direction, the pressure-sensitive surfaces of the pressure-sensitive member being directed to all of the combustion chambers, so that knocking produced in either combustion chamber can be detected with substantially the same sensitivity.

The knocking detecting device of the third aspect is advantageous in that pressure vibrations due to knocking sounds from combustion chambers of a multicylinder engine which are remoter from the pressure-sensitive member act on the pressure-sensitive surfaces at an angle closer to a right angle than pressure vibrations from combustion chambers which are closer to the pressure-sensitive member, with the magnitude of a Vector component of pressure vibrations which acts perpendicularly on the pressure-sensitive surfaces being offset by the distance between the combustion chamber and the pressure-sensitive surfaces, so that knocking produced in either combustion chamber can be detected with substantially the same sensitivity, and hence the single knocking detecting device can detect knocking in the multicylinder engine with high precision.

According to a fourth aspect, the pressure-sensitive surfaces of the pressure-sensitive member is covered with a film having a specific acoustic impedance which is intermediate between the specific acoustic impedance of water and that of the piezoelectric element which the pressure-sensitive surfaces are composed of, for thereby increasing the transmissibility of the pressure vibration due to the knocking sounds to the pressure-sensitive surfaces.

The knocking detecting device of the fourth aspect is advantageous in that, with pressure-sensitive surfaces being covered with the film having a specific acoustic impedance which is intermediate between the specific acoustic impedance of water and that of the pressure-sensitive surfaces, the gap or difference between the specific acoustic impedances of the water and pressure-sensitive surfaces is reduced to increase the transmissibility of the pressure vibrations due to the knocking sounds to the pressure-sensitive surfaces, so that knocking sounds having a small sound pressure in the coolant water can be detected reliably, and the film can protect the lead wires connected to the pressure-sensitive surfaces for maintaining stable pressure-sensitive characteristics for a long period of time. cl BRIEF DESCRIPTION OF THE DRAWINGS Various other objects, features and advantages of the present invention will be apparent from the following detailed description when considered in connection with the accompanying drawings, in which like reference characters designate like or corresponding parts throughout the several views, and wherein:

DESCRIPTION OF THE PREFERRED EMBODIMENTS

The present invention will be described in the following in connection with certain preferred embodiments which are shown by way of illustrative example.

Figure 2:
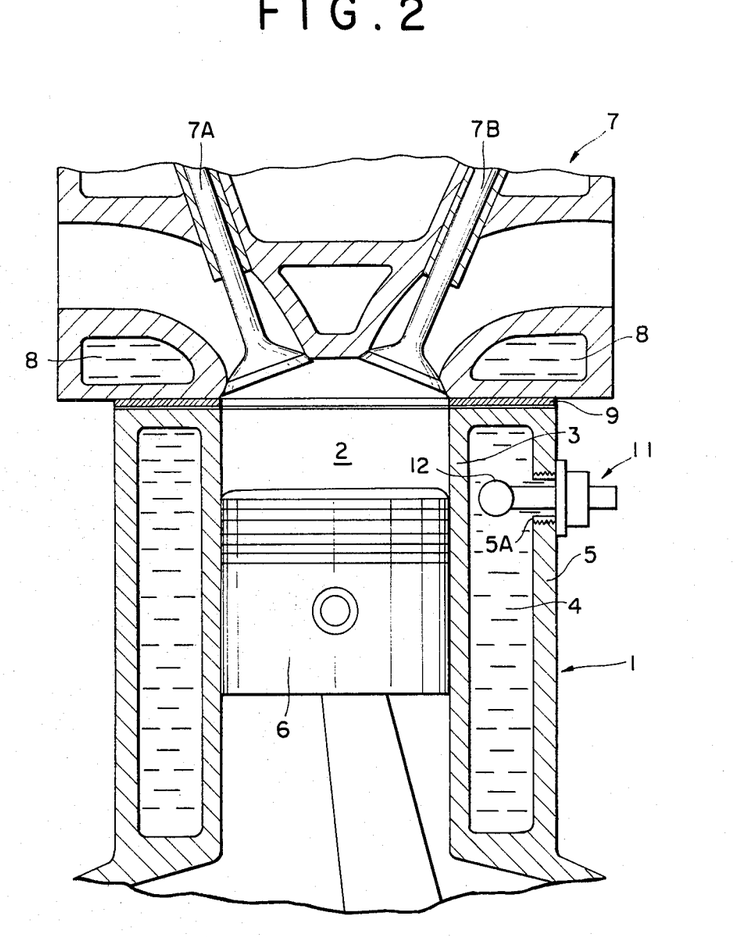
FIG. 2 is a vertical cross-sectional view of an engine to which is attached a knocking detecting device according to a first embodiment of the present invention.
Figure 3:
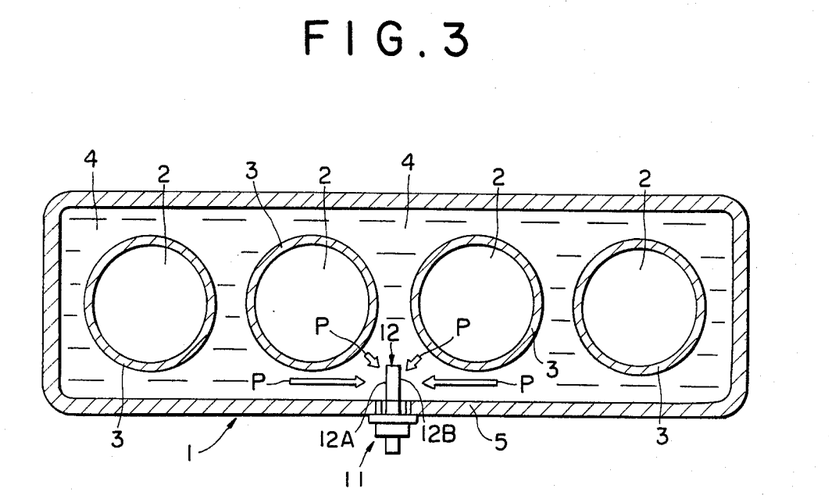
FIG. 3 is a horizontal cross-sectional view of the engine with the knocking detecting device of the first embodiment being installed thereon.
Figure 4:
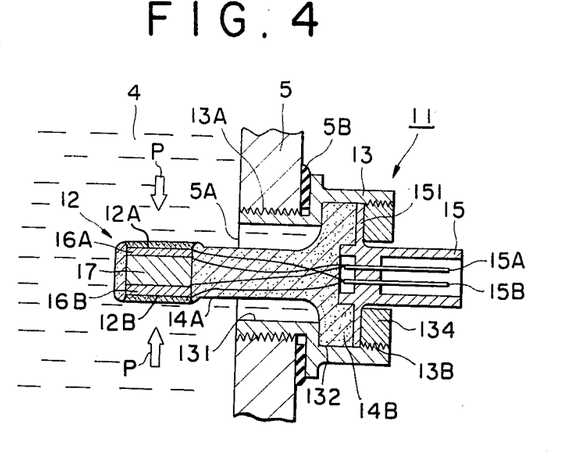
FIG. 4 is a longitudinal cross-sectional view of the knocking detecting device according to the first embodiment.

FIGS. 2 through 4 show a knocking detecting device for an internal combustion engine according to a first embodiment.

A knocking detecting device 11 according to a first embodiment is characterized by pressure-sensitive surfaces comprising two disc-shaped piezoelectric elements and facing away from each other.

The knocking detecting device 11 is attached to a water-cooled automotive gasoline engine having four combustion chambers arranged in line. A cylinder block 1 has combustion chambers 2 each having a piston 6 slidably fitted therein and surrounded by a water chamber 4 with a cylinder liner 3 disposed as a partition therebetween. A cylinder head 7 is mounted on the cylinder block 1 with a gasket 9 interposed therebetween and has a water chamber 8 and intake and exhaust valves 7A, 7B. The cylinder block 1 and the cylinder head 7 jointly constitute an engine block. The water chamber 4 in the cylinder block 1 and the water chamber 8 in the cylinder head 7 are held in communication with each other, and connected to a radiator (not shown) through a non-illustrated coolant water passage.

The knocking detecting device 11 is mounted on an outer sidewall 5 of the cylinder block 1 at a position between the second and third cylinders as shown in FIG. 3. The outer sidewall 5 has an internally threaded hole 5A communicating with the water chamber 4 defined between the outer sidewall 5 and the cylinder liner 3. The knocking detecting device 11 has a casing 13 including an externally threaded attachment end 13A threaded into the hole 5A in the outer sidewall 5 with a washer 5B sandwiched between the outer sidewall 5 and the casing 13. The knocking detecting device 11 also includes a pressure-sensitive member 12 supported on a support member 14 and projecting beyond the outer sidewall 5 of the engine block into the water chamber 4, the pressure-sensitive member 12 being disposed in coolant water in the water chamber 4.

The knocking detecting device 11 is composed, as shown in FIG. 4, of the pressure-sensitive member 12 for detecting knocking sounds in the coolant water, the casing 13, the support member 14 projecting forwardly from inside the casing 13 and supporting on a distal end thereof the pressure-sensitive member 12, and a connector 15 connected to lead wires connected to the pressure-sensitive member 12. The support member 14 is made of a vibration-isolating material such as rubber or synthetic resin mixed with carbon powder, and has a T-shaped cross section having a small-diameter rod-shaped support 14A and a large-diameter flange 14B. The pressure-sensitive member 12 is molded integrally with the distal end of the support member 14. The pressure-sensitive member 12 comprises two disc-shaped piezoelectric elements 16A, 16B each having a diameter of 10 mm and a thickness of about 1 mm and bonded with heat-resistant adhesive to opposite surfaces of a backing member 17 in the form of a thick disc having the same diameter as that of the piezoelectric elements. The piezoelectric elements 16A, 16B have positive sides bonded to the backing member 17 and negative sides serving as disc-shaped planar pressure-sensitive surfaces 12A, 12B, which face away from each other and are covered with rubber or resin for better transmission of knocking sounds from the water to the pressure-sensitive member. The large-diameter flange 14B of the support member 14 is secured endwise to a flange 151 of the connector 15. The connector 15 has a terminal 15A to which there are connected the lead wires connected to the positive electrodes of the piezoelectric elements 16A, 16B, and a terminal 15B to which there are connected the lead wires connected to the negative electrodes of the piezoelectric elements 16A, 16B. The lead wires are embedded integrally in the support member 14.

The casing 13 of the knocking detecting device has a hole 131 through which extends the rod-shaped support 14A holding the pressure-sensitive member 12, and a larger-diameter hole 132 in which the flange 14B of the support member 14 is fitted. The support member 14 is mounted in the casing 13 with the flange 14B being fastened in position by a nut 134 threadedly engaging a threaded portion 13B of the larger-diameter hole 132.

With the arrangement of the knocking detecting device 11 according to the present embodiment, the small-diameter rod-shaped support 14A made of a vibration-isolating material projects from a central portion of the casing through the inner hole 131 thereof forwardly of the casing, and supports on its distal end the pressure-sensitive member 12. When the device of this embodiment is mounted on the engine block, the pressure-sensitive member 12 and the front surface of the small-diameter rod-shaped support 14A of the support 14 are disposed in the coolant water. The pressure-sensitive member 12 is located in the vicinity of the cylinder liner within the water chamber extending in surrounding relation to the combustion chamber of the engine, with the pressure-sensitive surfaces 12A, 12B lying perpendicularly to the outer wall 5 of the engine block and facing away from each other and toward the four cylinders arranged in line.

The knocking detecting device constructed according to the first embodiment will operate and have advantages as follows.

When knocking is produced in the combustion chamber 2, pressure vibrations are transmitted from the combustion chamber 2 through the cylinder liner 3 into the coolant water, and pressure waves P or knocking sounds travel through the coolant water in the water chamber. The pressure waves P are received by the pressure-sensitive surface 12A or 12B of the pressure-sensitive member 12 located in the water in the vicinity of the cylinder liner, and are converted by the disc-shaped piezoelectric element 16A or 16B into electrical vibrations, the output voltage of which is delivered via the lead wires to the terminals 15A, 15B of the connector 15.

The knocking detecting device according to the present embodiment is advantageous in that the pressure-sensitive member positioned in the coolant water surrounding the cylinder liner can detect knocking sounds transmitted intensively into the water, and can detect occurrences of slight knocking in the combustion chamber with high sensitivity and hence can detect limits of knocking generation since the pressure-sensitive member detects knocking sounds at a position close to the source of knocking sounds.

The pressure-sensitive member is mounted on the distal end of the rod-shaped support made of a vibration-isolating material and is spaced from the casing of the knocking detecting device, with the pressure-sensitive surfaces extending perpendicularly to the outer wall of the engine block so as not to detect transverse vibrations of the engine block. Therefore, reception of mechanical noise vibrations of the engine block by the pressure-sensitive member is substantially completely prevented, and the knocking detecting device can detect knocking produced in the combustion chamber with a high signal-to-noise ratio.

With the pressure-sensitive surfaces facing away from each other and positioned centrally of the in-line multiple cylinders while facing toward these cylinders, the pressure-sensitive member can detect knocking occurring in any of the cylinders with substantially the same sensitivity.

The pressure-sensitive surfaces are covered with the rubber or resinous film having a specific acoustic impedance which is intermediate between the specific acoustic impedance of the water and that of the pressure-sensitive member. Thus, knocking sounds are transmitted at a high rate from the water to the pressure-sensitive member for detection of weak knocking sounds in the water with high sensitivity.

The pressure-sensitive member which is rendered water-resistant all around by the resinous or rubber film will retain its pressure-sensitive characteristics for a long period of time.

As described above, the knocking detecting device of the first embodiment of the present invention can detect pressure vibrations due to knocking in the cylinders with high sensitivity and high signal-to-noise ratio, and also can detect occurrences of slight knocking and limits of knocking generation to a nicety, whereby ignition timing can correctly be controlled for optimum engine performances as for thermal efficiency, power output, and fuel consumption dependent on the operating conditions.

The present invention will now be described with reference to FIGS. 5A and 5B which show a knocking detecting device for an internal combustion engine according to a second embodiment.

Figure 5A:
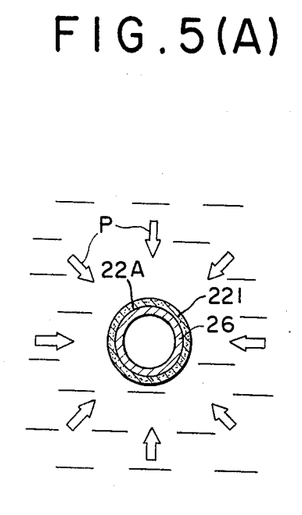
FIG. 5(A) is a transverse cross-sectional view of a pressure-sensitive member of a knocking detecting device according to a second embodiment.

A knocking detecting device 21 according to a second embodiment is characterized, as shown in FIG. 5A, in that it comprises a pressure-sensitive surface composed of a single hollow cylindrical piezoelectric element, and the cylindrical pressure-sensitive surface extends perpendicularly to the outer wall of an engine block to which the knocking detecting device is attached. The parts identical with those of the first embodiment will be denoted by the identical reference characters, and will not be described.

Figure 5B:
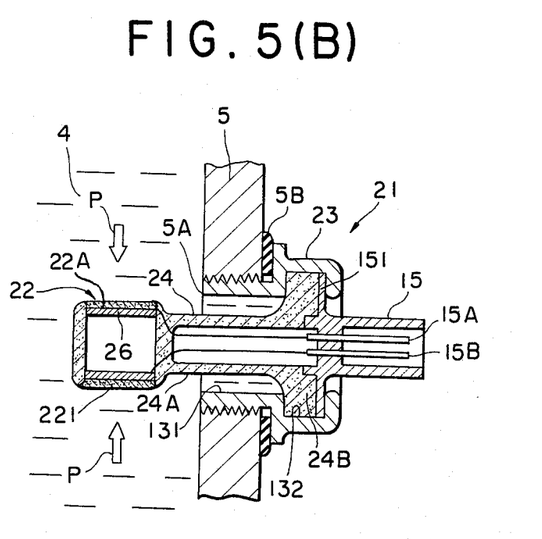
FIG. 5(B) is a longitudinal cross-sectional view of the knocking detecting device of the second embodiment.

As shown in FIG. 5B, the knocking detecting device 21 of the second embodiment is fixedly mounted on the attachment hole 5A extending through the outer sidewall 5 of the cylinder block as with the first embodiment. The knocking detecting device 21 has a pressure-sensitive member 22 projecting from the outer sidewall 5 of the engine block inwardly into the water chamber and disposed in the coolant water 4.

The knocking detecting device 21 comprises the pressure-sensitive member 22 having the cylindrical pressure-sensitive surface for detecting knocking sounds in the coolant water, a casing 23, a support member 24 projecting from inside the casing 23 far in the forward direction and having a distal end on which the pressure-sensitive member 22 is supported, and a connector 15. The support member 24 is formed of a vibration-isolating material such as rubber, and comprises a small-diameter rod-shaped hollow support 24A and a large-diameter flange 24B, the pressure-sensitive member 22 being molded integrally with the distal end of the support member 24. The pressure-sensitive member 22 comprises a cylindrical piezoelectric element 26 having an outside diameter of 10 mm, an inside diameter of 8 mm, and a length of 10 mm, and disposed coaxially with the rod-shaped hollow support 24A. The cylindrical piezoelectric element 26 has an outer cylindrical surface 22A serving as a pressure-sensitive surface which is covered with a thin film 221 of rubber for acoustic impedance matching with water and for good transmission of knocking sounds from the water to the piezoelectric element 26. To an end of the large-diameter flange 24B of the support member 24 is fixed a flange 151 of the connector 15. The casing 23 has a large-diameter hole 132 in which there are fitted the large-diameter flange 24B of the support member 24 and the flange 151 of the connector 15. The connector 15 includes a terminal 15A to which is connected a lead wire connected to an outer electrode of the piezoelectric element 26, and a terminal 15B to which is connected a lead wire connected to an inner electrode of the piezoelectric element 26.

With the arrangement of the knocking detecting device, the rod-shaped hollow support 24A made of a vibration-isolating material projects from a central portion of the casing through the inner hole 131 thereof forwardly of the casing, and supports on its distal end the pressure-sensitive member 22. When the device of this embodiment is mounted on the engine block, the pressure-sensitive member 22 and the rod-shaped hollow support 24A are disposed in the coolant water. The pressure-sensitive member 22 is located in the vicinity of the cylinder liner surrounding the engine combustion chamber, with the pressure-sensitive surface 22A extending perpendicularly to the outer wall 5 of the engine block and having diametrically opposite portions facing away from each other.

The knocking detecting device of the present embodiment as installed on a water-cooled internal combustion engine detects pressure waves P transmitted through the water upon knocking, and produces an output voltage which is delivered to the terminals 15A, 15B of the connector 15, by a process which is the same as that of the knocking detecting device according to the first embodiment.

The knocking detecting device of the second embodiment is advantageous, as with the device of the first embodiment, in that it will detect generation of knocking in the combustion chamber with high sensitivity and high signal-to-noise ratio. The device of the second embodiment is further advantageous in that the cylindrical pressure-sensitive surface can detect knocking sounds impinging thereon perpendicularly in any direction within the coolant water, and the pressure-sensitive member is simple in construction and can be manufactured less costly.

Figure 6:
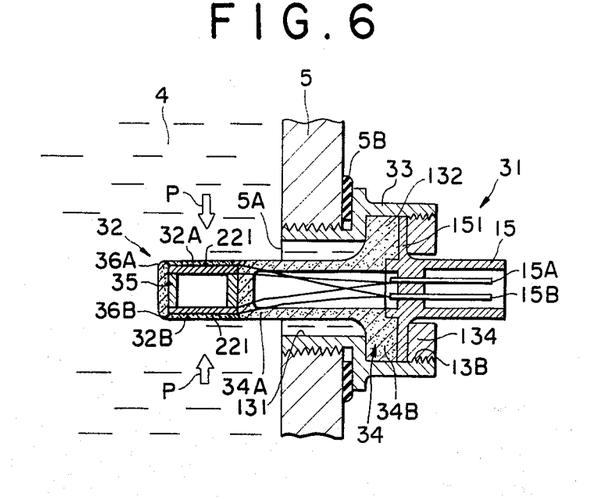
FIG. 6 is a longitudinal cross-sectional view of a knocking detecting device according to a third embodiment.

The present invention will now be described with reference to FIG. 6 which illustrates a knocking detecting device for an internal combustion engine according to a third embodiment. The knocking detecting device of the third embodiment is characterized in that it comprises two pressure-sensitive surfaces composed of bimorph piezoelectric elements and facing away from each other.

A knocking detecting device 31 comprises a pressure-sensitive member 32 having pressure-surfaces composed of bimorph piezoelectric elements for detecting knocking sounds is coolant water, a casing 33, a support member 34 projecting inside the casing 33 far in the forward direction and having a distal end on which the pressure-sensitive member 34 is supported, and a connector 15. The support member 34 is formed of a vibration-isolating material such as rubber or resin and comprises a small-diameter rod-shaped hollow support 34A and a large-diameter flange 34B. The pressure-sensitive member 32 is molded integrally with the distal end of the support member 34. The pressure-sensitive member 32 is composed of two disc-shaped bimorph piezoelectric elements 36A, 36B each having a diameter of 10 mm and a thickness of about 1 mm attached with their directions of polarization being opposite to each other and outer electrodes serving as terminals. The bimorph piezoelectric elements 36A, 36B are bonded to open ends of a hollow cylinder 35 having an outside diameter of 10 mm, an inside diameter of 8 mm and a length of 8 mm. The piezoelectric elements 36A, 36B have disc-shaped surfaces 32A, 32B on negative sides, which serve as pressure-sensitive surfaces facing away from each other and covered with a thin film 221 of rubber for acoustic impedance matching between the pressure-sensitive surfaces and the water so as to improve the rate of transmission of knocking sounds from the water to the piezoelectric elements.

The large-diameter flange 34B of the support member 34 has an end to which is secured a flange 151 of the connector 15. The large-diameter flange 34B of the support member 34 and the flange 151 of the connector 15 are mounted in a large-diameter hole 132 in the casing 33, and fastened in place by a nut 134 threadedly engaging is threaded portion 13B of the large-diameter hole 132. The connector 15 includes a terminal 15A to which are connected lead wires connected to the positive electrodes of the two bimorph piezoelectric elements, and a terminal 15B to which are connected lead wires connected to the negative electrodes of the piezoelectric elements.

With the arrangement of the knocking detecting device 31 according to the present embodiment, the rod-shaped hollow support member 34A made of a vibration-isolating material projects from inside the casing through the inner hole 131 therein in the forward direction, and supports on its distal end the pressure-sensitive member 32. When the device is mounted on the engine block, the pressure-sensitive member 32 and the rod-shaped hollow support member 34A are disposed in the coolant water with the pressure-sensitive surfaces 32A, 32B lying perpendicularly to the outer wall 5 of the engine block and facing away from each other toward multiple engine cylinders arranged in line.

In operation, when knocking sounds act as pressure waves P in the water on the pressure-sensitive surfaces of the device upon knocking in the combustion chamber, the bimorph piezoelectric elements are subjected to flexural vibrations in the same manner as a drum membrane vibrates, and produce an output voltage which is delivered to the connector terminals 15A, 15B.

The knocking detecting device according to the third embodiment utilizes bimorph piezoelectric elements as pressure-sensitive elements, and hence can produce a high output voltage. The device is therefore advantageous in that it can detect knocking sounds with a higher sensitivity than that of the devices of the first and second embodiments. The knocking detecting device of the third embodiment also shares the advantages that the device according to the first embodiment has.

Figure 7:
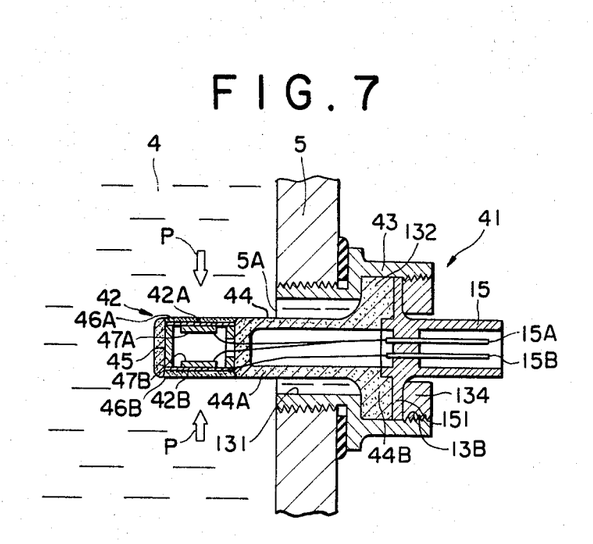
FIG. 7 is a longitudinal cross-sectional view of a knocking detecting device according to a fourth embodiment.

The present invention will now be described with reference to FIG. 7 which shows a knocking detecting device according to a fourth embodiment. A knocking detecting device 41 is different from the device of the third embodiment in that pressure-sensitive surfaces are composed of vibratory plates, and bimorph piezoelectric elements are bonded to inner central portions of the vibratory plates. The device 41 is characterized in that the vibratory plates resonate to knocking sounds to detect knocking in combustion chambers with higher sensitivity and high signal-to-noise ratio.

As with the devices of the first through third embodiments, the knocking detecting device 41 is fixedly placed in position in an attachment hole 5A defined through an outer wall 5 of a cylinder block. The detecting device comprises a pressure-sensitive member 42 projected from the outer wall 5 of the engine block inwardly into coolant water 4 in a water chamber.

The knocking detecting device 41 is composed of the pressure-sensitive member 42 having pressure-sensitive surfaces 42A, 42B including resonant plates for detecting knocking sounds, a casing 43, a support member 44 projecting from inside the casing far in the forward direction and supporting on its distal end the pressure-sensitive member 42, and a connector 15. The support member 44 is made of a vibration-isolating material such as ruber mixed with carbon powder, and includes a small-diameter rod-shaped hollow support 44A and a large-diameter flange 44B. The pressure-sensitive member 42 is molded integrally with the distal end of the support member 44. The pressure-sensitive member 42 comprises vibratory plates 46A, 46B of stainless steel each having a diameter of 10 mm and a thickness of $50\mu$, a hollow cylinder 45 of stainless steel having an outside diameter of 10 mm, an inside diameter of 8 mm, and a length of 4 mm and including open ends to which the vibratory plates 46A, 46B are welded, and bimorph piezoelectric elements 47A, 47B each having a diameter of 5 mm and bonded to inner surfaces of the vibratory plates 46A, 46B, the pressure-sensitive surfaces 42A, 42B being covered with a resinous film for acoustic impedance matching with coolant water so as to receive knocking sounds efficiently from the water. The vibratory plates have a resonance frequency selected to agree with a central frequency of knocking sounds. The large-diameter flange 44B of the support member 44 is secured at an end thereof to a flange 151 of the connector 15. The large-diameter flange 44B of the support member 44 and the flange 151 of the connector 15 are mounted in a large-diameter hole 132 in the casing 43, and fastened in place by a nut 134 held in threaded engagement with a threaded portion 13B of the large-diameter hole 132. The connector 15 includes a terminal 15A to which are connected lead wires connected to the positive electrodes of the two bimorph piezoelectric elements, and a terminal 15B to which is connected a lead wire connected to the vibratory plate which is on the negative side.

With the knocking detecting device 41 according to this embodiment, the small-diameter rod-shaped hollow support 44A made of a vibration-isolating material projects from a central portion of the casing 43 through the inner hole 131 thereof in the forward direction, and supports on the distal end thereof the pressure-sensitive member 42. When the knocking detecting device is installed on the engine block, the pressure-sensitive member 42 and the small-diameter rod-shaped hollow support 44A of the support member 44 are disposed in the coolant water. The pressure-sensitive member 42 is located in the vicinity of the cylinder liner in the water chamber that extends around an engine combustion chamber, with the pressure-sensitive surfaces 42A, 42B lying perpendicularly to the outer wall 5 of the engine block and facing away from each other toward multiple engine cylinders arranged in line.

When knocking is produced in a combustion chamber of a water-cooled internal combustion engine, pressure vibrations are transmitted from the combustion chamber through the cylinder liner into the engine coolant water, and travels as pressure waves P or knocking sounds through the coolant water in the water chamber.

As the pressure waves P reach the pressure-sensitive surface 42A or 42B of the pressure-sensitive member 42 placed in the water in the vicinity of the cylinder liner, the vibratory plate resonates to the frequency of the knocking sounds and is subjected to flexural vibrations in the same manner as a drum membrane vibrates. The vibrations of the vibratory plate converted by the piezoelectric element attached thereto into an electrical signal, which is delivered as an output voltage to the terminals 15A, 15B of the connector 15.

With the pressure-sensitive surfaces of the device according to the fourth embodiment being arranged to resonate to the frequency of knocking sounds which travel through the coolant water, they can detect knocking sounds with a higher sensitivivity and a higher signal-to-noise ratio since the vibratory plates have a much lower sensitivity to pressure vibrations other than knocking sounds, such as pulsating water currents from a coolant pump which have a frequency different from that of knocking sounds.

Accordingly, the device of the fourth embodiment is advantageous in that it requires a simple control circuit which dispenses with a complex circuit for removing noise signals from received signals. The knocking detecting device of the fourth embodiment shares the advantages accruing from the device according to the first embodiment.

Furthermore, the piezoelectric elements of the pressure-sensitive member are disposed within the hollow body composed of the two metal vibratory plates and the hollow metal cylinder, and hence are completely shielded from external electrical noise signals. The knocking detecting device is capable of detecting knocking in combustion chambers with a much higher signal-to-noise ratio than those of the devices according to the previous embodiments since almost no electrical noise signals from electrical equipments attached to the engine find their way into the knocking detecting devie.

The piezoelectric elements are rendered completely moisture-resistant as the vibratory plates are welded to the metal cylinder in which the piezoelectric elements are housed. The pressure-sensitive member as it is placed in the water retains its sensitivity characteristics for the reception of knocking sounds and can be used stably for a long period of time.

The knocking detecting device of the fourth embodiment is also advantageous in that the pressure-sensitive elements bonded to the vibratory plates may comprise ordinary piezoelectric elements having a reduced thickness and a high sensitivity, instead of bimorph piezoelectric elements. Thus, the knocking detecting device can be manufactured less costly.

Figure 8:
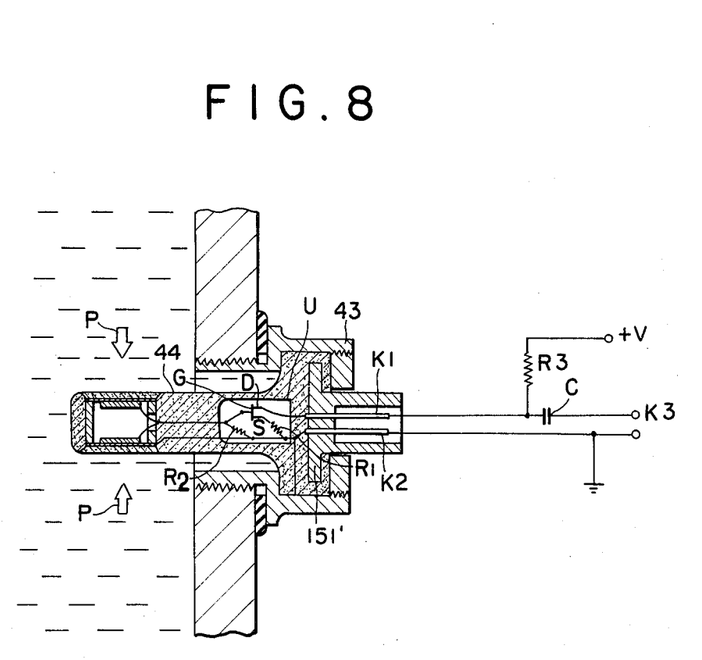
FIG. 8 is a longitudinal cross-sectional view of a knocking detecting device according to a fifth embodiment.

The present invention will now be described with reference to FIG. 8 which illustrates a knocking detecting device according to a fifth embodiment, the description being directed mainly to differences with the devices of the other embodiments.

The knocking detecting device according to the fifth embodiment comprises a support member 44 made of a vibration-isolating material and housing therein an impedance-converting unit U for lowering the output impedance of the knocking detector so as to prevent electrical noises generated by electrical parts of an automotive engine from entering the device.

The knocking detecting device also comprises a socket 151' including a flange having a diameter smaller than an inner peripheral wall of a casing 43 and hence kept out of contact with the casing in order to take up or remove effectively mechanical noise vibrations from an outer sidewall of an engine block. The other parts of the device are of the same construction as that of the corresponding parts of the knocking detecting device according to the fourth embodiment.

The impedance-converting unit U is composed of a junction type field-effect transistor (FET) and resistor R1, R2. The field-effect transistor has a gate G connected to the positive electrodes of the piezoelectric elements, a drain D connected to a connector terminal K1, and a source S connected via the biasing resistor R1 to a connector terminal K2. The connector terminal K2 is connected to the negative terminals of the piezoelectric elements and to the casing of the knocking detecting device. The gate resistor R2 is connected between the gate G and the terminal K2.

The connector terminal K1 is connected to an external DC power supply V through a loade resistor R3 for the FET. The field-effect transistor produces as an output signal a knocking signal which is delivered from the terminal K1 via a capacitor C to an output terminal K3.

In operation, pressure waves P transmitted through coolant water upon knocking in a combustion chamber are received by the pressure-sensitive surfaces of the knocking detecting device, which produce an electrical signal fed to the external terminal through the impedance-converting unit housed in the knocking detecting device. With this arrangement, the output impedance of the knocking detecting device is lowered to prevent entry of electrical noises generated by electrical parts of the automotive engine. The knocking detecting device is also practically advantageous in that the field-effect transistor amplifies knocking signals to generate large knocking signal outputs.

The knocking detecting device according to the fifth embodiment is further advantageous in that the flange of the socket 151' is smaller in diameter than the inner peripheral wall of the casing 43 and hence is held out of contact therewith, so that mechanical noise signals from the outer sidewall of the engine block are prevented from being transmitted to the pressure-sensitive member more effectively than the knocking detecting devices according to the previous embodiments.

Briefly summarized, the knocking detecting device for internal combustion engines according to the present invention can detect pressure vibrations generated upon knocking in combustion chambers with high sensitivity and high signal-to-noise ratio, and hence also can detect occurrences of slight knocking and limits of knocking generation. Accordingly, the knocking detecting device enables correct control of ignition timing and fuel injection timing for gaining optimum engine performances as for thermal efficiency, power output, the fuel economy dependent on engine operating conditions.

While the present invention has been described with reference to representative embodiments, the invention is not limited to the illustrated embodiments and various changes or modifications may be made therein.

For example, although the hollow cylindrical piezoelectric element of the device according to the second embodiment extends perpendicularly to the outer sidewall of the engine block, the hollow cylindrical piezoelectric element may be arranged to extend parallel to the axes of engine cylinders for detection with higher sensitivity of knocking in combustion chamber, provided mechanical noise vibrations from the outer sidewall of the engine block are absorbed sufficiently or prevented from reaching the piezoelectric element.

Many other design changes, additions, and modifications may be made in the present invention without departing from the scope of the claims.

What is claimed as new and desired to be secured by letters patent of the United States is:

1. A knocking detecting device for an internal combustion engine including an engine block having combustion and water chambers defined by a partition and a coolant water passage connected to the water chamber, said knocking detecting device comprising:

a casing in the form of an annular member fastened substantially perpendicularly to an outer sidewall of said engine block;

a support member made of a vibration-isolating material of any one of rubber and synthetic resin, and having one end fastened in a liquidtight manner to said casing and the other end projecting a predetermined distance from the outer sidewall of said engine block to a position within said water chamber;

a pressure-sensitive member including pressure-sensitive surfaces mounted on the projecting end of said support member and facing away from each other, said pressure-sensitive surfaces extending perpendicularly to the outer sidewall of said engine block, for detecting, as a change in an electrical signal, pressure vibrations transmitted as a knocking sound to said pressure-sensitive surfaces through coolant water from said partition when knocking is produced in said combustion chamber; and lead wires extending through said support member and connected to said pressure-sensitive member for delivering the electrical signal change responsive to the knocking as detected by said pressure-sensitive member exteriorly of the engine block, whereby only the knocking produced in the combustion chamber can effectively be detected as the pressure vibrations in the coolant water.

2. A knocking detecting device according to claim 1, wherein said pressure-sensitive member comprises piezoelectric elements for detecting pressure vibrations acting on the pressure-sensitive surfaces as a change in an electrical signal.

3. A knocking detecting device according to claim 2, wherein said pressure-sensitive surfaces of the pressure-sensitive member are covered with a film having a specific acoustic impedance which is intermediate between the specific acoustic impedance of water and that of said piezoelectric elements which said pressure-sensitive surfaces are composed of, thereby increasing the rate of transmission of pressure vibrations due to the knocking sounds to said pressure-sensitive surfaces.

4. A knocking detecting device according to claim 3, wherein said pressure-sensitive member comprises two disc-shaped piezoelectric elements facing away from each other.

5. A knocking detecting device according to claim 3, wherein said pressure-sensitive member comprises two disc-shaped bimorph piezoelectric elements facing away from each other.

6. A knocking detecting device according to claim 1, wherein said pressure-sensitive member comprises vibratory plates having a predetermined thickness and a predetermined area, and a resonance frequency in the range of frequencies of knocking produced, and electromechanical transducers, said vibratory plates being mechanically displaceable in response to pressure vibrations acting as a knocking sound on the pressure-sensitive surfaces, thereby enabling said electromechanical transducers to detect the mechanical displacement of said vibratory plates as a change in an electrical signal.

7. A knocking detecting device according to claim 6, wherein said pressure sensitive member comprises two disc-shaped vibratory plates having a resonance frequency in the range of frequencies of knocking produced, facing away from each other, and two bimorph piezoelectric elements bonded respectively to inner central portions of said vibratory plates.

8. A knocking detecting device according to claim 7, wherein said pressure-sensitive surfaces of said vibratory plates are covered with a film having a specific acoustic impedance which is intermediate between the specific acoustic impedance of water and that of the vibratory plates which said pressure-sensitive surfaces are composed of, thereby increasing the rate of transmission of the pressure vibrations due to the knocking sounds to said pressure-sensitive surfaces.

9. A knocking detecting device according to claim 8, further comprising an impedance-converting unit comprising a junction type field-effect transistor, a first resistor connected to a gate of said transistor, and a second resistor connected to a source of said transistor, for lowering the output impedance, thereby preventing electrical noises generated by electrical parts of an automotive engine from entering therein.

10. A knocking detecting device according to claim 1, for an in-line internal combustion engine having a plurality of combustion chambers arranged in line in said cylinder block, wherein said casing is fastened to the outer sidewall of said engine block at a central portion thereof in the longitudinal direction, and said pressure-sensitive surfaces of said pressure-sensitive member are directed to all of said combustion chambers, whereby knocking produced in either combustion chamber can be detected with substantially the same sensitivity.

11. A knocking detecting device according to claim 1, wherein said pressure-sensitive member comprises a single hollow cylindrical piezoelectric element which forms said pressure-sensitive surface by a pair of portions facing away from each other on a continuous outer cylindrical wall thereof and provided prependicularly to said outer wall of said engine block.

* * * * *